US010392295B2

(12) United States Patent
Bremner et al.

(10) Patent No.: US 10,392,295 B2
(45) Date of Patent: Aug. 27, 2019

(54) COMPOSITE MATERIAL

(71) Applicant: Alusid Limited, Preston (GB)

(72) Inventors: Alasdair Bremner, Lancashire (GB);
David Stuart Binns, Lancashire (GB)

(73) Assignee: Alusid Limited, Preston (GB)

( * ) Notice: Subject to any disclaimer, the term of this patent is extended or adjusted under 35 U.S.C. 154(b) by 0 days.

(21) Appl. No.: 15/276,086

(22) Filed: Sep. 26, 2016

(65) Prior Publication Data

US 2017/0144922 A1 May 25, 2017

Related U.S. Application Data

(63) Continuation of application No. 14/439,576, filed as application No. PCT/GB2013/052820 on Oct. 30, 2013, now Pat. No. 9,452,949.

(30) Foreign Application Priority Data

Oct. 30, 2012 (GB) .................................. 1219511.1

(51) Int. Cl.
*C03C 3/078* (2006.01)
*C03C 14/00* (2006.01)
(Continued)

(52) U.S. Cl.
CPC ............ *C03C 14/004* (2013.01); *B09B 3/005*
(2013.01); *B09B 3/0083* (2013.01);
(Continued)

(58) Field of Classification Search
CPC ... C04B 35/117; C04B 35/119; C04B 35/488;
C04B 35/4885; B32B 17/06; C03C 8/14;
C03C 8/20
(Continued)

(56) References Cited

U.S. PATENT DOCUMENTS 2,839,414 A * 6/1958 Fenity .................... C04B 35/16
501/153
3,822,764 A * 7/1974 Val ............................ E04B 1/86
181/286
(Continued)

FOREIGN PATENT DOCUMENTS

DE 10012343 A1 3/2001
GB 138799 A 2/1920
(Continued)

OTHER PUBLICATIONS

"U.S. Appl. No. 14/439,576, Non Final Office Action dated Nov. 25, 2015", 11 pgs.
(Continued)

*Primary Examiner* — Noah S Wiese
(74) *Attorney, Agent, or Firm* — Schwegman Lundberg & Woessner, P.A.

(57) ABSTRACT

The present invention relates to a composite material, particularly a composite material for ceramic tiles, stone cladding, surface tops (e.g. worktops), and the like. The composite materials are typically derived from waste products. The composite materials of the present invention are formed from a glass component and a non-glass mineral component (e.g. ceramics and/or glaze). Generally the composite materials do not require any binders (especially synthetic binders) to hold the materials together. Therefore, the composite materials and products made therefrom are typically recyclable.

13 Claims, 2 Drawing Sheets

(51) Int. Cl.
*B09B 3/00* (2006.01)
*C03C 1/00* (2006.01)
*C04B 32/00* (2006.01)
*C04B 26/02* (2006.01)
*C04B 33/13* (2006.01)
*C04B 33/14* (2006.01)
*C04B 33/02* (2006.01)
*C04B 33/132* (2006.01)
*C04B 35/626* (2006.01)
*C03C 10/00* (2006.01)
*C03C 23/00* (2006.01)
*B44C 5/04* (2006.01)
*C03C 27/00* (2006.01)
*C04B 35/78* (2006.01)

(52) U.S. Cl.
CPC ............ *B44C 5/0407* (2013.01); *C03C 1/002* (2013.01); *C03C 3/078* (2013.01); *C03C 10/0063* (2013.01); *C03C 23/007* (2013.01); *C03C 27/00* (2013.01); *C04B 26/02* (2013.01); *C04B 32/005* (2013.01); *C04B 33/025* (2013.01); *C04B 33/13* (2013.01); *C04B 33/1324* (2013.01); *C04B 33/14* (2013.01); *C04B 35/62685* (2013.01); *C04B 35/78* (2013.01); *C03C 2214/04* (2013.01); *C03C 2214/20* (2013.01); *C03C 2214/30* (2013.01); *C04B 2235/36* (2013.01); *C04B 2235/5427* (2013.01); *C04B 2235/6562* (2013.01); *C04B 2235/6567* (2013.01); *C04B 2235/96* (2013.01); *Y02P 40/69* (2015.11); *Y02W 30/95* (2015.05)

(58) Field of Classification Search
USPC .............................. 428/426–429; 501/15, 17
See application file for complete search history.

(56) References Cited

U.S. PATENT DOCUMENTS

| | | | |
|---|---|---|---|
| 4,111,708 A | 9/1978 | Flannery et al. | |
| 4,271,109 A * | 6/1981 | Boyce | C04B 33/13 |
| | | | 264/667 |
| 5,028,569 A | 7/1991 | Cihon | |
| 5,649,987 A | 7/1997 | Greulich | |
| 5,814,571 A | 9/1998 | Saiki et al. | |
| 6,340,650 B1 | 2/2002 | Haun | |
| 6,824,877 B1 | 11/2004 | Groth | |
| 6,919,126 B2 | 7/2005 | Wu et al. | |
| 7,416,690 B2 | 8/2008 | Haun | |
| 7,741,773 B2 | 6/2010 | Mahmood et al. | |
| 9,452,949 B2 | 9/2016 | Bremner et al. | |
| 2012/0115983 A1 | 5/2012 | Moreno et al. | |
| 2015/0299032 A1 | 10/2015 | Bremner et al. | |

FOREIGN PATENT DOCUMENTS

| | | | | |
|---|---|---|---|---|
| JP | H08319148 A | * | 12/1996 | ............ C04B 28/26 |
| JP | 11255538 A | | 9/1999 | |
| JP | 3069726 B2 | | 7/2000 | |
| JP | 2000256057 A | | 9/2000 | |
| JP | 2000351664 A | | 12/2000 | |
| KR | 20020015461 A | | 2/2002 | |
| WO | WO-03055822 A1 | | 7/2003 | |
| WO | WO-2005121041 A1 | | 12/2005 | |
| WO | WO-2011030366 A2 | | 3/2011 | |
| WO | WO-2014068301 A1 | | 5/2014 | |

OTHER PUBLICATIONS

"U.S. Appl. No. 14/439,576, Notice of Allowance dated Jun. 14, 2016", 8 pgs.
"U.S. Appl. No. 14/439,576, preliminary amendment filed Apr. 29, 2015", 8 pgs.
"U.S. Appl. No. 14/439,576, Response filed Mar. 25, 2016 to Non Final Office Action dated Nov. 25, 2015", 9 pgs.
"Great Britian Application Serial No. GB1219511.1, United Kindom Search Report dated Feb. 28, 2013", 4 pgs.
"International Application Serial No. PCT/GB2013/052820, International Preliminary Report on Patentability dated May 5, 2015", 6 pgs.
"International Application Serial No. PCT/GB2013/052820, International Search Report dated Jan. 23, 2014", 5 pgs.
"International Application Serial No. PCT/GB2013/052820, Written Opinion dated Jan. 23, 2014", 5 pgs.
Bernardo, E., et al., "Development and mechanical properties of metal—particulate glass matrix composites from recycled glasses", Composites Part A: Applied Science and Manufacturing 35(1), (Jan. 2004), 17-22.

* cited by examiner

COMPOSITE MATERIAL

PRIORITY APPLICATIONS

This application is a continuation of U.S. patent application Ser. No. 14/439,576, filed on 29 Apr. 2015, which application is a U.S. National Stage Filing under 35 U.S.C. 371 from International Application No. PCT/GB2013/052820, filed on 30 Oct. 2013, and published as WO/2014/068301 A1 on 8 May 2014, which claims the benefit under 35 U.S.C. 119 to UK Application No. 1219511.1, filed on 30 Oct. 2012; which applications and publication are incorporated herein by reference in their entirety.

INTRODUCTION

The present invention relates to a composite material, particularly a composite material derived from waste products, and particularly a composite material which is itself recyclable. The invention also relates to methods of manufacture of the composite material, along with shaped items comprising the composite material.

BACKGROUND ART

There exists a widespread demand for decorative building materials and surfaces such as interior or exterior tiling, cladding, facing brick, and surface tops (e.g. worktops, table tops, and the like) to provide aesthetically pleasing internal and external environments. Traditional materials such as sheet stone (e.g. stone cladding) and ceramic tiling has commonly satisfied this demand. However, a rising awareness of the finite supply of mineral resources and the ever increasing quantities of landfill waste, has led to the innovation of new, more sustainable composite materials which incorporate household and industrial waste materials. Moreover, since raw materials are typically transported over long distances in order to produce the relevant decorative building materials, there is a need to address the cost and energy burden this imposes.

More sustainable composite materials include Corian® (commercially available from Du Pont) and Silestone® (commercially available from Cosentino).

Corian® is a solid, non-porous material comprising about 33% acrylic resin (PMMA—polymethyl methacrylate) and about 66% natural minerals (e.g. aluminium trihydrate). Corian® is supplied as sheets or in shaped form.

Silestone® is a dense, non-porous stone-like material comprising about 93% pulverized quartz, with the remainder being constituted by resin binders (unsaturated polyester resins) and pigments. The resin binders harden with the quartz to duly bind together the quartz aggregate.

Though Corian® and Silestone® are successful products, the inventors recognised a need for alternative composites with improved environmental sustainability. In particular, Corian® and Silestone® composites are not straightforward to recycle, since both contain binders which must first be removed in an expensive and laborious pre-treatment step before they can be effectively recycled. As such, waste Corian® and Silestone® tends to be destined for landfill due to the uneconomical recycling process. Moreover, though Corian® and Silestone® products do incorporate some waste/recycled raw materials, the total waste content is less than 75 wt %.

It is therefore an object of the present invention to solve at least one of the problems of the prior art.

Another object of the invention is to provide a composite material with improved recyclability.

Another object of the invention is to provide a composite material with a higher waste/recyclate content than those of the prior art, whilst still maintaining the structural integrity and aesthetic qualities of the composite material.

Another object of the invention is to make use of waste materials (such as cathode ray tubes) which would be otherwise destined for landfill or low-value applications (e.g. in roads).

Another object of the invention is to provide a composite material displaying unique aesthetic qualities, and that can be modified to produce a diversity of aesthetic and textural appearances.

Another object of the invention is to provide a composite material which has easier processing requirements, especially in the production of a shaped item (e.g. a tile). For example, an object of the invention is to provide a composite material which may be casted (e.g. into a shaped item) such that it retains its profile and texture upon heating (thereby not necessarily requiring a firing support mould). Moreover, an object of the invention is to provide a composite material which, after heating (e.g. during formation of a shaped item), does not require annealing during cooling, thereby enabling more efficient heat recover, rapid cooling with water, and higher throughput rates through a kiln.

SUMMARY OF THE INVENTION

In accordance with a first aspect of the present invention there is provided a composite material comprising:
  a glass component; and
  a non-glass mineral component;
wherein the composite material comprises less than 5 wt % synthetic binding agents.

In accordance with a further aspect of the present invention, which represents a variation of the first aspect, there is provided a composite material comprising:
  a glass component; and
  a non-glass mineral component;
wherein the composite material comprises less than 5 wt % synthetic binding agents;
wherein the composite material comprises at least 20 wt % non-glass mineral component.

In accordance with a second aspect of the present invention there is provided a composite material comprising:
  a glass component; and
  a non-glass mineral component;
wherein the composite material comprises at least 75 wt % waste materials.

In accordance with a further aspect of the present invention, which represents a variation of the second aspect, there is provided a composite material comprising:
  a glass component; and
  a non-glass mineral component;
wherein the composite material comprises at least 75 wt % waste materials;
wherein the composite material comprises at least 20 wt % non-glass mineral component.

In accordance with a third aspect of the present invention there is provided a method of manufacture of a composite material comprising the steps of:
  i) providing a blended mixture comprising a glass component and a non-glass mineral component;
  ii) subjecting the blended mixture to heat to produce the composite material;

wherein the blended mixture comprises at least 75 wt % waste materials.

In accordance with a further aspect of the invention, which represents a variation of the third aspect, there is provided a method of manufacture of a composite material comprising the steps of:

iii) providing a blended mixture comprising a glass component and a non-glass mineral component;
iv) subjecting the blended mixture to heat to produce the composite material;

wherein the blended mixture comprises at least 75 wt % waste materials;
wherein the composite material comprises at least 20 wt % non-glass mineral component.

In accordance with a fourth aspect of the present invention there is provided a method of manufacture of a composite material comprising the steps of:

i) providing a blended mixture comprising a glass component and a non-glass mineral component;
ii) subjecting the blended mixture to heat to produce the composite material;

wherein the blended mixture comprises less than 5 wt % synthetic binding agents.

In accordance with a further aspect of the invention, which represents a variation of the fourth aspect, there is provided a method of manufacture of a composite material comprising the steps of:

iii) providing a blended mixture comprising a glass component and a non-glass mineral component;
iv) subjecting the blended mixture to heat to produce the composite material;

wherein the blended mixture comprises less than 5 wt % synthetic binding agents;
wherein the composite material comprises at least 20 wt % non-glass mineral component.

In accordance with a fifth aspect of the present invention there is provided a composite material obtainable by, obtained by, or directly obtained by any one of the methods according to the third or fourth aspects.

In accordance with a sixth aspect of the present invention there is provided a shaped item comprising the composite material as described herein.

In accordance with a seventh aspect of the present invention there is provided a use of the composite material as described herein to provide a decorative surface.

In accordance with an eighth aspect of the present invention there is provided a composite material comprising a glass component and a lead component dispersed throughout the composite material.

In accordance with a ninth aspect of the present invention there is provided a use of a leaded-glass cathode ray tube (CRT) to produce composite material.

In accordance with a tenth aspect of the present invention there is provided a use of a leaded-glass cathode ray tube (CRT) to produce an antimicrobial surface.

Unless otherwise stated, features, including optional, suitable, and preferred features of any aspect of the present invention may also be features, including optional, suitable, and preferred features of any other aspect of the present invention.

The composite materials of the present invention have a rich, unique, aesthetic finish not offered by any existing materials. Moreover, due to the tolerance of the manufacturing process, the input materials (including any additives) and particle sizes can be easily adapted to obtain a wide range of different aesthetic finishes, textures and colours. Since the composite materials of the invention can be put to aesthetic use (e.g. for surface decoration or in ornamental pieces), an entirely new visual experience is hereby provided.

The composite materials of the invention are structurally extremely robust, and serve as an alternative material for many existing products, such as ceramic tiles, stone cladding, surface tops (e.g. worktops), etc. The composite materials have a low porosity, are resistant to weathering and therefore highly durable in both exterior and interior applications.

The inventors have found that, by applying their unique processing technology to blended mixtures of glass and non-glass minerals, excellent composites can be obtained using extremely high proportions (in some cases 100%) of waste and/or recycled materials. In particular, dirty, unsorted waste, such as that typically destined for low-value applications or landfill, can be used to obtain high quality composite materials, thus effectively utilise otherwise unusable waste streams.

Furthermore, structurally stable and useful composites can be produced in the absence of synthetic binders, which are traditionally included to bond the relevant components of the composite together. With the present invention, strong bonds between the relevant components are formed during manufacture. As such, the composite materials of the invention are themselves recyclable, without the need for pre-treatments to remove said binders. This too adds to the environmental sustainability of these composite materials.

A further advantage is that the composite materials of the invention can, following casting (eg. into shaped items of the invention) and heating, retain their relief profiles and textures, thereby enabling the formation of shaped items without any firing support moulds. This significantly reduces the processing burden and the requirement for moulds.

A further advantage of the present invention is that locally sourced raw materials may be employed rather than materials transported over long distances. This reduces costs and the energy burden otherwise imposed.

A further advantage of the present invention is that there is no requirement for annealing on cooling of the composite materials following heating/kiln-baking. This provides a significant energy saving and reduction in manufacturing times. In particular this reduced annealing requirement facilitates heat recovery, rapid water cooling, and enables more rapid transit through the tunnels of continuously-fired kilns.

Finally, the by-products of the composite material manufacturing process, can be recycled and re-introduced into the same manufacturing process to thus provide a fully environmentally sustainable process.

BRIEF DESCRIPTION OF THE DRAWINGS

For a better understanding of the present invention, and to show how embodiments of the same can be put into effect, reference is now made, by way of example, to the following diagrammatic drawings, in which.

DETAILED DESCRIPTION OF THE INVENTION

Definitions

Figure 1:
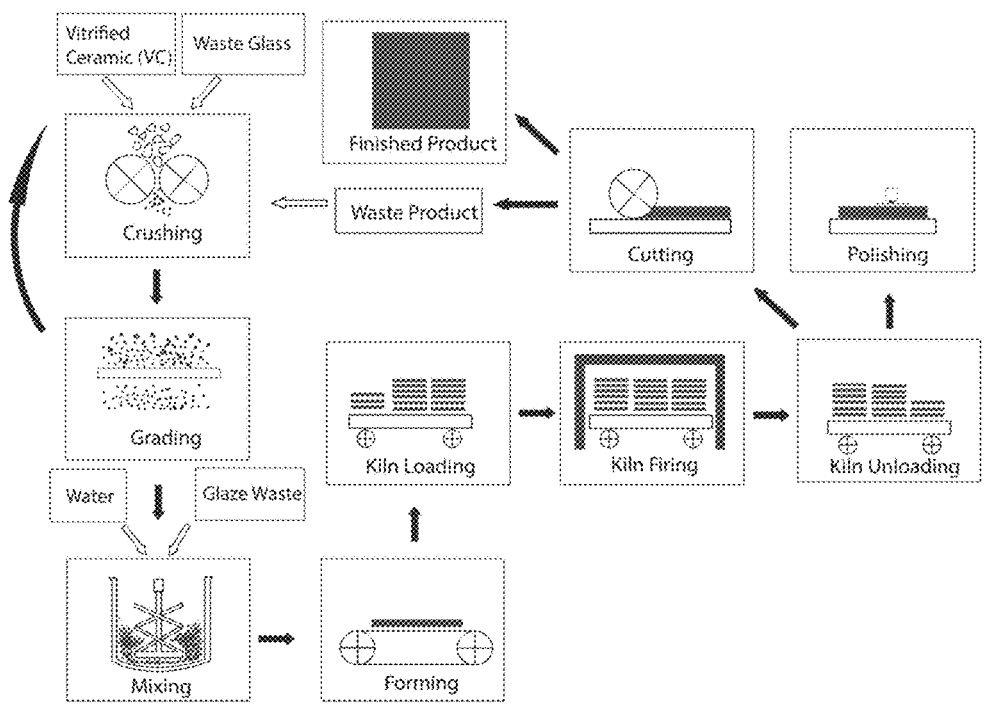
FIG. 1 is process flow diagram illustrating an embodiment of a method of manufacture of a composite material.

Herein, a "glass component" includes glass, i.e. an amorphous non-crystalline solid which is brittle an optically transparent.

Herein, "virgin glass" refers to non-recycled glass.

Herein, a "non-glass mineral component" refers to inorganic non-metallic materials which are not classified as glasses. This typically includes ceramics, ceramic glazes, and the like, and may also in some embodiments include stone and/or quarry waste.

Herein, "ceramics" are defined as inorganic non-metallic materials which are fused by heat and subsequently cooled.

Herein, "tableware" refers to crockery and such like, typically comprised of ceramic material.

Herein, "sanitary ware" refers to bathroom furniture (e.g. lavatories, sinks, baths) and such like, comprised of ceramic materials.

Herein, "glaze", also known as ceramic glaze, is a vitreous layer/coating (or enamel) that is fused to the surface of ceramic materials. Glazes are generally used to colour, decorate, strengthen or waterproof said ceramic materials. A glaze typically comprises silica (as a glass former), alumina (as a network modifier), and metal oxides (as a flux) in appropriate proportions.

Herein, the term "fused" refers to materials being bonded through being melted together (e.g. in a kiln).

Herein, "waste" refers to materials which have been disposed of.

Herein, "recyclate" refers to waste materials that have been recycled, potentially after a treatment step to remove certain impurities or unwanted materials.

Herein, a "binding agent" is defined as a substance that sets and hardens independently so as to bind materials together. This may include cements (e.g. Portland cement, gypsum), natural resins, and synthetic resins (e.g. epoxy resin, unsaturated polyester resins, acrylic resin binders). References herein to a binding agent may include one or more such binding agents combined.

Herein, a "synthetic binding agent" is defined as a binding agent (see above) produced synthetically (i.e. rather than naturally occurring). Synthetic binding agents are well known in the art, and typically include resin binders such as unsaturated polyester resins, epoxy resins, acrylic resins (e.g. polymethyl methacrylate—PMMA), and such like. References herein to a synthetic binding agent may include one or more such binding agents combined.

Herein, a "cathode ray tube (CRT) screen" is the front screen, typically of a television, upon which an image is projected. Often such CRT screens comprise a lead component (i.e. lead glass) to block the emission of X-radiation.

Weight percentages (wt %) of a particular component are given with reference to any material of which the particular component forms a constituent part. Unless stated otherwise, weight percentages refer to "dry weights", and suitably exclude any solvents (e.g. water) used to slurry ingredients to assist in the mixing thereof. It will be understood by those skilled in the art that the summation of wt % values for all components with a material (including both stipulated and unstipulated components) should total 100 wt %. It will be understood by those skilled in the art that stipulation of a weight percentage for a particular component does not necessarily limit the potential weight percentage values allowed for other components (whether such other components are stipulated or not), except where a stipulated minimum wt % for the particular component will naturally limit the maximum wt % for other components (whether stipulated or otherwise) given that the total wt % values for all components (including any unstipulated ingredients) will inevitably total 100 wt %. By way of example, a composite material comprising an unspecified quantity of a glass component and at least 20 wt % non-glass mineral component, naturally implies an upper limit of 80 wt % on the glass component, though non-zero quantities of glass component less than 80 wt % are also covered, since other unspecified components (e.g. inorganic antimicrobial agent) and/or quantities of non-glass mineral component in excess of 20 wt % may constitute at least some of the remaining 80 wt % of the composite material. In some embodiments, the sum of wt % of all stipulated components totals 100 wt %.

Particle size relates to the length of the longest dimension of a given particle. Particle size may be measured by a variety of methods well known in the art, including sieving, laser defraction, and so forth.

Herein, the term "consists essentially of" or "essentially consists of" means a given material primarily consists of a given component, suitably at least 75%, suitably at least 90%, suitably at least 97%, suitably at least 99%, and suitably substantially 100% of the given component.

Composite Material

The present invention also provides a composite material comprising:
a glass component; and
a non-glass mineral component;
wherein the composite material comprises less than 5 wt % synthetic binding agents.

The present invention also provides a composite material comprising:
a glass component; and
a non-glass mineral component;
wherein the composite material comprises less than 5 wt % synthetic binding agents;
wherein the composite material comprises at least 20 wt % non-glass mineral component.

The present invention provides a composite material comprising:
a glass component; and
a non-glass mineral component;
wherein the composite material comprises at least 75 wt % waste materials.

The present invention also provides a composite material comprising:
a glass component; and
a non-glass mineral component;
wherein the composite material comprises at least 75 wt % waste materials;
wherein the composite material comprises at least 20 wt % non-glass mineral component.

Suitably, the composite material comprises a blended mixture, preferably a blended particulate mixture, of the relevant components (i.e. a blended mixture of at least a glass component and a non-glass mineral component). Suitably, the composite material comprises a substantially homogeneous blend of the relevant components. However, the skilled person will understand that the blended mixture may be blended to varying degrees to alter the aesthetic and/or textural qualities.

Suitably, the composite material comprises a fused blended mixture, preferably a fused blended particulate mixture, of the relevant components. Suitably the blended mixture is a heat-fused blended mixture. Suitably the different components (or at least a portion thereof) of the blended mixture are fused together. In an embodiment, at least part of the composite material is fused together, suitably heat-fused, to permanently bond at least part the components together (physically and/or chemically). In some embodiments, partial fusing may be sufficient to provide the bulk composite material with the required structural integrity. For instance, fusing of the components at the surface of the blended mixture may be sufficient to robustly encapsulate the unfused parts of the blended mixture within, and thereby impart overall structural integrity to the bulk. The degree of fusing throughout the composite material depends on the fusing process itself and the dimensions and density of the composite material formed. In an embodiment, the components of the composite material are completely fused. In a particular embodiment, the composite material comprises a kiln-fired blended mixture of the relevant components.

Suitably the components of the composite material may be bound together within a fused matrix, most suitably within a fused-glass matrix. In an embodiment, the composite material comprises a fused-glass matrix. The fused-glass matrix suitably comprises the glass component which has been at least partially self-fused (e.g. heat-fused by transiently melting the glass component). In a particular embodiment, only the glass component is fused, with the other component(s) being trapped within the resulting fused-glass matrix. The fused-glass matrix may suitably encapsulate the other component(s) to provide a rigid permanent structure to the composite material. In another embodiment, the glass component is at least partially fused (if not fully fused) to the non-glass mineral component. In another embodiment, the composite material comprises both fused glass and glass fused to the non-glass mineral component.

In an embodiment, the composite material comprises an inorganic antimicrobial agent (e.g. toxic metal, such as a lead component).

The composite material may be porous.

The composite material suitably has a density of 1-3 g/cm$^3$, more suitably 1.2-2.5 g/cm$^3$, more suitably 2-2.5 g/cm$^3$, most suitably 2.1-2.4 g/cm$^3$.

The composite material (or shaped item—see later) may comprise large particles or even large objects. For example, the composite material (or shaped item) may comprise at least 5 wt % particles having a particle size greater than or equal to 1 cm, suitably greater than or equal to 2 cm, suitably greater than or equal to 5 cm, suitably greater than or equal to 10 cm. Suitably the composite material (or shaped item) may comprise at least 10 wt % particles having any of the aforementioned particle sizes, suitably at least 20 wt %. In some embodiments, the composite material (or shaped item) comprises a pre-formed object (e.g. a mug, or a brick). In alternative embodiments, the composite material itself may be considered free from any such large particles and/or objects defined herein (e.g. as above), since such large particles and/or objects may be considered auxiliary inclusions within a shaped item, where said shaped item includes the composite material and the large particles and/or objects. The composite materials of the invention are particularly good at bonding (e.g. following heating) directly to large objects, such as ceramic objects (e.g. mug, teapots, etc.) by virtue of their unique composition.

Glass Component

The glass component suitably comprises glass particles (e.g. granulated or crushed). The average particle size (i.e. before any fusion to fuse the glass) of the glass particles is suitably less than 2 mm, suitably less than 1 mm, suitably less than 750 μm. Suitably at least 65 wt % of the glass particles have a particle size of less than 2 mm, suitably at least 80 wt %, more suitably at least 90 wt %, more suitably at least 95 wt %, and most suitably at least 99 wt %. Suitably between 30 and 60 wt % of the glass particles have a particle size less than 355 μm.

Suitably, at least part of the glass component is self-fused within the composite material. As such, at least part of the glass component within the composite material may suitably form a fused-glass matrix. This fused-glass matrix is suitably obtained by the method described below—i.e. a blended mixture is heated to fuse at least some of the glass. The fused-glass matrix may suitably encapsulates other ingredients/components to provide a rigid permanent structure to the composite material. However, in other embodiments, the glass component is fused to other components (e.g. to the non-glass mineral component).

The glass-component suitably comprises glass having a silicon dioxide content of at least 60 wt %, more suitably at least 70 wt %, and suitably at least 75 wt %. The glass may also comprise other minerals, such as metal oxides (e.g. sodium oxide, calcium oxide).

In a particular embodiment, the glass component (whether waste glass or non-waste/virgin glass) comprises:
65-80% w/w silica;
5-22% w/w sodium oxide;
1-20% w/w calcium oxide;
0.1-7% w/w magnesium oxide;
0.1-7% w/w aluminium oxide.

In a particular embodiment, the glass component (whether waste glass or non-waste/virgin glass) comprises:
70-74% w/w silica;
12-16% w/w sodium oxide;
5-11% w/w calcium oxide;
1-3% w/w magnesium oxide;
1-3% w/w aluminium oxide.

The composite material suitably comprises at least 30 wt % glass component, more suitably at least 40 wt %, most suitably at least 45 wt %. The composite material suitably comprises at most 80 wt % glass component, more suitably at most 70 wt %, most suitably at most 60 wt %. In a particular embodiment, the composite material comprises 40-60 wt % glass component. In a particular embodiment, the composite material comprises 50 wt % glass component.

In an embodiment, the glass component comprises a lead component (e.g. lead oxide (PbO) or metallic lead). The glass component may comprise 18-40 wt % lead component, suitably 20-30 wt %, suitably approximately 25 wt % lead component. For instance, the glass component may comprise lead-glass, suitably greater than or equal to 50 wt % lead-glass, more suitably greater than or equal to 70 wt % lead-glass, most suitably greater than or equal to 90 wt % lead-glass. In a particular embodiment, the glass component is lead-glass. The lead-glass itself may suitably comprise 18-40 wt % lead component (especially lead oxide), suitably approximately 20-30 wt % lead component, most suitably approximately 25 wt % lead component. The lead glass may be derived from cathode ray tubes (CRTs) or CRT front screens. The glass component may suitably comprise lead glass from cathode ray tube (CRT) screens. In a particular embodiment, the glass component consists essentially of lead glass from CRTs. As such, this provides a means of recycling lead-glass rather than extracting lead therefrom in order that it can be disposed of in the standard manner.

The glass component suitably comprises glass waste. The glass component suitably consists essentially of glass waste. The glass waste may comprise waste float, post-consumer glass waste, and/or waste/recycled cathode ray tubes. Such glass waste may include waste container glass (e.g. used bottles, jars, etc. such as those deposited at "bottle banks" at recycling centres) and/or waste/recycled cathode ray tubes (CRTs) (e.g. the front leaded-glass screen, the rear glass tube, or both). This is an environmentally effective use of otherwise hazardous waste materials which are difficult to dispose of safely.

In a particular embodiment, the glass waste is waste container-glass. Waste-container glass may be of any colour, depending on the aesthetic qualities sought of the composite material. The glass component may suitably comprise recycled glass waste.

In a particular embodiment, the waste glass comprises waste/recycled CRTs. In a particular embodiment, the waste/recycled CRTs comprise leaded-glass CRT front screens (i.e. the television screen itself). Suitably, such CRT screens comprise a lead component (e.g. metallic lead or more typically lead oxide (PbO)). The CRT screens suitably comprise 18-40 wt % lead component (e.g. lead oxide), more suitably 20-30 wt %, most suitably approximately 25 wt %. The lead component, which is toxic to biological organisms (including humans and microbes alike), may be trapped within the fused blended mixture of the composite material. Suitably the composite material exhibits minimal leaching of the lead component therefrom. However, in an embodiment, a minimal amount of leaching of the lead component serves to impart antimicrobial properties to the surface of the composite material.

In a particular embodiment, the waste glass comprises recycled glass. In a particular embodiment, the waste glass essentially consists of recycled glass. Such recycled glass may have been pre-treated to remove certain impurities (e.g. synthetic compounds such as binder resins and such like).

The waste glass may include glass chips, porcelain, and/or stone.

In a particular embodiment, small amounts of "virgin glass", in addition to the waste glass, may suitably be included as part of the glass component, for instance, to provide particular colouring to the composite material. To this end, the composite material may comprise 0-3 wt % virgin glass.

In a particular embodiment, the composite material and the glass component is free of virgin glass.

Suitably the glass component comprises less than 10 wt % synthetic binders, suitably less than 5 wt %, suitably less than 1 wt %. Suitably the glass component comprises less than 10 wt % binders, suitably less than 5 wt %, suitably less than 1 wt %. Suitably the glass component is free of any synthetic binders. Suitably, the glass component is free of any binders (natural or synthetic).

Non-Glass Mineral Component

The non-glass mineral component suitably comprises non-glass mineral particles (e.g. granulated or crushed). The average particle size (i.e. before any fusion to fuse the glass) of the non-glass mineral particles is suitably less than 2 mm, suitably less than mm, suitably less than 750 µm. Suitably at least 65 wt % of the non-glass mineral particles have a particle size of less than 2 mm, suitably at least 80 wt %, more suitably at least 90 wt %, more suitably at least 95 wt %, and most suitably at least 99 wt %. Suitably between 30 and 60 wt % of the non-glass minerals has a particle size less than 355 µm.

In an embodiment, at least part of the non-glass mineral component is held within a fused-glass matrix. In another embodiment, at least part of the non-glass mineral component is fused with the glass component.

The non-glass mineral component suitably comprises ceramics. The non-glass mineral component suitably comprises at least 60 wt % ceramics, more suitably at least 70 wt %, most suitably at least 75 wt %. The non-glass mineral component suitably comprises at most 95 wt %, more suitably at most 90 wt %, and most suitably at most 85 wt %.

The non-glass mineral component suitably comprises glaze. The glaze is suitably earthenware glaze, such as that used in relation to tiles. Suitably the glaze begins to melt at the maximum kiln temperature. Glaze particles suitably have a particle size less than 355 µm. The glaze may suitably comprise borax frit. The non-glass mineral component suitably comprises at least 5 wt % glaze, more suitably at least 10 wt % glaze, most suitably at least 15 wt % glaze. The non-glass mineral component suitably comprises at most 35 wt % glaze, more suitably at most 30 wt %, most suitably at most 25 wt %.

The non-glass mineral component suitably comprises a colouring mineral (e.g. colouring metal oxide). Colouring minerals include pigments and the like. The colouring minerals may include any suitable material for colouring ceramics. The colouring minerals may be derived from the ceramics themselves and/or the glaze itself. The non-glass mineral component may comprise no colouring minerals, but may comprise at least 0.25 wt %. The non-glass mineral component suitably comprises at most 10 wt % colouring minerals, more suitably at most 5 wt %, and most suitably at most 2.5 wt %. Colouring minerals may be added to modify the colour and aesthetic qualities of the composite material.

In a particular embodiment, the non-glass mineral component comprises both ceramics and glaze. In a particular embodiment, the non-glass mineral component comprises ceramics, glaze, and a colouring mineral.

The composite material suitably comprises at least 20 wt % non-glass mineral component, more suitably at least 30 wt %, most suitably at least 40 wt %. Having at least 20 wt % non-glass mineral component allows the composite materials of the invention to retain their relief profiles and textures, following casting (eg. into shaped items of the invention) and heating, thereby alleviating the need for firing support moulds. This advantage is particularly well observed where the composite material comprises at least 30 wt % glass component. This significantly reduces the processing burden and the requirement for moulds. In addition, having at least 20 wt % non-glass mineral component alleviates the requirement for annealing on cooling of the composite materials following heating/kiln-baking. This provides a significant energy saving and reduction in manufacturing times. In particular this reduced annealing requirement facilitates heat recovery, rapid water cooling, and enables more rapid transit through the tunnels of continuously-fired kilns. The composite material suitably comprises at most 80 wt % non-glass mineral component, more suitably at most 70 wt %, most suitably at most 60 wt %. In a particular embodiment, the composite material comprises 35-60 wt % non-glass mineral component. In a particular embodiment, the composite material comprises 50 wt % non-glass mineral component.

The composite material suitably comprises 40-60 wt % ceramics. The composite material suitably comprises 5-15 wt % glaze. The composite material suitably comprises 0-5 wt % colouring mineral, suitably 0.25-2 wt %. In a particular embodiment, the composite material comprises:

40-60 wt % ceramics
5-15 wt % glaze
0-5 wt % colouring mineral

The non-glass mineral component may suitably comprise non-glass mineral waste, such as ceramic waste (optionally including ceramic glaze). The non-glass mineral component suitably consists essentially of non-glass mineral waste (e.g. ceramic waste). Such non-glass mineral waste may be standard household waste (e.g. waste ceramics) and/or industrial waste (e.g. tableware waste, sanitary ware waste, quarry waste, brick rubble, processed mineral waste from coal-fired power stations). Suitably, the non-glass mineral waste is free of cement or gypsum-based materials.

In a particular embodiment, the non-glass mineral waste comprises recycled non-glass minerals. In a particular embodiment, the non-glass mineral waste essentially consists of recycled non-glass minerals (e.g. recycled ceramics). Such recycled non-glass minerals may have been pre-treated to remove certain impurities.

Waste ceramics may include vitrified sanitary ware, or even waste earthenware.

Waste glaze may include waste tile glaze (e.g. from tile manufacturers), waste earthenware glaze, or even waste stoneware glazes.

Suitably the non-glass mineral component comprises less than 10 wt % synthetic binders, suitably less than 5 wt %, suitably less than 1 wt %. Suitably the non-glass mineral component comprises less than 10 wt % binders, suitably less than 5 wt %, suitably less than 1 wt %. Suitably the non-glass mineral component is free of any synthetic binders. Suitably, the non-glass mineral component is free of any binders (natural or synthetic).

Optional Inorganic Antimicrobial Agent

The composite material may comprise an inorganic antimicrobial agent, suitably dispersed within the composite material, preferably such that enough antimicrobial agent is available at the surface for surface-biocidal activity.

The inorganic antimicrobial agent may comprise or even consist of a lead component, such as the lead component described above. The lead component may be metallic lead or a lead compound (e.g. lead (II) oxide). Preferably the lead component is lead (II) oxide. In an embodiment, the lead component is an additive (i.e. blended into the composite material as a separate component). However, in preferred embodiments, the lead component is a part of the glass component itself, for instance where the glass component comprises or is made from lead glass. In a particular embodiment, the lead glass is derived from cathode ray tubes (CRTs) or CRT front screens.

Suitably the lead leaches out of the composite material to give a surface lead content sufficient to impart the required antimicrobial effect. Ideally, the composite material leaches lead at a rate which is non-toxic to humans but which provides an antimicrobial effect at the surface (e.g. to assist in the sterilisation of worktops or hospital surfaces). This is generally achieved by tailoring the following parameters of the composite material manufacturing process:
The wt % input of the lead component;
The wt % input of the glass component (the more glass, the more likely lead will be trapped);
The heating temperature (i.e. the higher the temperature, the more lead is trapped);
The heating times (i.e. longer heating times traps more lead).

In accordance with an aspect of the invention, the present invention provides a composite material comprising a glass component and an inorganic antimicrobial agent dispersed throughout the composite material. In an embodiment, the inorganic antimicrobial agent is dispersed within the glass component.

This composite material of this particular aspect may be suitably manufactured in accordance with the methods described herein, though the non-glass mineral component may be optionally present or absent. All features, including optional, suitable and preferred features described herein in relation to the other composite materials may also be features, including optional, suitably and preferred features in relation to this composite material. Furthermore, shaped items (including antibacterial tables and worktops) may be equally formed from this particular composite material.

The present invention also provides a use of a leaded-glass cathode ray tube (CRT) to produce composite material.

The present invention also provides a use of a leaded-glass cathode ray tube (CRT) to produce an antimicrobial surface.

Waste Materials

The composite material suitably comprises waste materials, suitably at least 75 wt % waste materials. Suitably, both the glass component and non-glass mineral component comprise such waste materials. Glass waste may include glass container waste and/or waste CRT screens. It is worth noting that waste CRT screens are currently deemed unusable until the lead is extracted therefrom, thus the present invention represents an advance in recycling potential of such materials. Non-glass mineral waste may include waste tableware, sanitary ware (e.g. bathroom items), quarry waste, processed waste from coal-fired power stations, brick rubble, etc.

The waste materials may be otherwise destined for landfill or low-value applications. The waste materials may be household or industrial waste materials. Such waste materials may be recycled or unrecycled waste. Under certain circumstances, at least part of the waste materials are recycled to remove certain impurities prior to the manufacture of the composite material of the invention.

In a particular embodiment, the composite material comprises at least 75 wt % waste materials.

In a particular embodiment, the composite material comprises at least 90 wt % waste materials.

In a particular embodiment, the composite material comprises at least 97 wt % waste materials.

In a particular embodiment, the composite material consists essentially of waste materials.

The composite materials may also comprise waste products derived from by-products of the composite material manufacturing process or from waste/recycled composite materials of the present invention.

Binding Agents

As explained previously, a "binding agent" is a substance that sets and hardens independently so as to bind materials together. This may include cements (e.g. Portland cement, gypsum), natural resins, and synthetic resins (e.g. epoxy resin, unsaturated polyester resins, acrylic resin binders). A "synthetic binding agent" is a binding agent produced synthetically, such as unsaturated polyester resins, epoxy resins, acrylic resins (e.g. polymethyl methacrylate—PMMA), and such like. References herein to a "binding agent" suitably exclude any other ingredients within the composite materials, such as the glass component or non-glass mineral component.

Suitably, the composite material comprises less than 5 wt % synthetic binding agent, more suitably less than 3 wt %, more suitably less than 1 wt %, more suitably less than 0.1 wt %. Preferably, the composite material is free from synthetic binding agents.

Suitably, the composite material comprises less than 5 wt % binding agent (whether synthetic or natural), more suitably less than 3 wt %, more suitably less than 1 wt %, more suitably less than 0.1 wt %. Preferably, the composite material is free from binding agents.

Suitably, the composite material is free from non-recyclable binding agents.

It is a particular advantage of the present invention that binding agents are not required for binding the aggregate component materials, which in the present case include the components of the blended mixture (i.e. at least the glass component and the non-glass mineral component). Instead, under the processing conditions in question, and with the particular combination of ingredients of the present invention, the blended mixture fuses together to form the composite material. The absence of any binders (especially synthetic binders) in the composite materials ensures that the composite materials are themselves directly recyclable without any pre-treatments to remove the binders. This allows off-cuts and waste materials, generated as a by-product of the composite material manufacturing process, to be reintroduced directly back into said manufacturing process to maximise utility of all the available materials.

Particular Formulations

In general, the composite materials of the invention are described by reference to the "dry weight" of their respective ingredients. As such, the input ingredients may be considered in terms of these dry weights. However, it will be readily understood by those skilled in the art that such composite materials may be manufactured by initially forming a slurry of the relevant ingredients (e.g. using an appropriate quantity of a slurry solvent, such as water) to aid in the initial mixing thereof prior to baking in the kiln to form the composite material. Such kiln-baking generally removes most or all of the slurry solvent.

In a particular embodiment, the composite material comprises:
- 40-60 wt % glass;
- 30-50 wt % ceramics;
- 5-15 wt % glaze;
- 0-5 wt % colourant (e.g. colouring oxide).

In a particular embodiment, the composite material comprises:
- 40-60 wt % waste glass;
- 30-50 wt % waste ceramics;
- 5-15 wt % waste glaze;
- 0-5 wt % colourant (e.g. colouring oxide).

In a particular embodiment, the composite material comprises:
- 30 and 80 wt % glass component;
- at least 20 wt % non-glass mineral component (suitably at most 70 wt %), where the non-glass mineral component comprises at least 60 wt % ceramics;
- wherein the glass component comprises:
- 65-80% w/w silica;
- 5-22% w/w sodium oxide;
- 1-20% w/w calcium oxide;
- 0.1-7% w/w magnesium oxide;
- 0.1-7% w/w aluminium oxide;
- wherein the composite material comprises less than 1 wt % synthetic binders.

In a particular embodiment, the blended mixture precursor to the composite material (i.e. pre-heated mixture) comprises glass and ceramic particles:
- 30-60 wt % having a particle size less than or equal to 355 μm;
- 15-25 wt % having a particle size between 355-500 μm;
- 8-12 wt % having a particle size between 500-1000 μm;
- 9-13 wt % having a particle size between 1000-1400 μm;
- 4-14 wt % having a particle size between 1400-2000 μm.

Method of Manufacturing a Composite Material

The present invention provides a method of manufacturing a composite material comprising the steps of:
i) providing a blended mixture comprising a glass component and a non-glass mineral component;
ii) subjecting the blended mixture to heat to produce the composite material;
wherein the blended mixture comprises at least 75 wt % waste materials.

The present invention provides a method of manufacturing a composite material comprising the steps of:
i) providing a blended mixture comprising a glass component and a non-glass mineral component;
ii) subjecting the blended mixture to heat to produce the composite material;
wherein the blended mixture comprises at least 75 wt % waste materials;
wherein the composite material comprises at least 20 wt % non-glass mineral component.

The present invention also provides a method of manufacturing a composite material comprising the steps of:
i) providing a blended mixture comprising a glass component and a non-glass mineral component;
ii) subjecting the blended mixture to heat to produce the composite material;
wherein the blended mixture comprises less than 5 wt % synthetic binding agents.

The present invention also provides a method of manufacturing a composite material comprising the steps of:
i) providing a blended mixture comprising a glass component and a non-glass mineral component;
ii) subjecting the blended mixture to heat to produce the composite material;
wherein the blended mixture comprises less than 5 wt % synthetic binding agents;
wherein the composite material comprises at least 20 wt % non-glass mineral component.

The methods may suitably comprise one or more pre-heating steps (i.e. between steps i) and ii)). For instance, the methods may comprise the pre-heating step of shaping the blended mixture.

The methods may suitably comprise one or more post-heating steps (i.e. after step ii)). For instance, the methods may comprise the post-heating step of rapid cooling of the composite material and heat recovery.

The methods may additionally comprise one or more finishing steps, whereby the composite material is refined into its final form. For instance, the methods may comprise the finishing step of grinding, dimensioning, cutting, polishing, stone finishing, and recycling of trimmings, and waste cuts.

As the skilled person will readily appreciate, any components and/or quantitative values (e.g. wt % of components of the aforementioned composite material) described herein in relation to the composite material may suitably also apply in relation to the methods of their manufacture, and in particular may apply to the blended mixture.

i) Blended Mixture

The blended mixture is the blended precursor (i.e. pre-heated/pre-fused mixture) to the composite material. The blended mixture comprises at least a glass component and a non-glass mineral component, but may additionally include any of the further ingredient/components described above (e.g. the inorganic antimicrobial agent). The feedstock components of the blended mixture are described above in relation to the various components.

The blended mixture suitably comprises particles with an average particle size of less than 2 mm, suitably less than 1 mm, suitably less than 750 μm. Suitably at least 65 wt % of the particles of the blended mixture have a particle size of less than 2 mm, suitably at least 80 wt %, more suitably at least 90 wt %, more suitably at least 95 wt %, and most suitably at least 99 wt %. Suitably between 30 and 60 wt % of the particles have a particle size less than 355 μm. In a particular embodiment, the blended mixture comprises particles:

30-60 wt % having a particle size less than or equal to 355 μm;
15-25 wt % having a particle size between 355-500 μm;
8-12 wt % having a particle size between 500-1000 μm;
9-13 wt % having a particle size between 1000-1400 μm;
4-14 wt % having a particle size between 1400-2000 μm.

The composite materials of the present invention tolerate a variety of particle size distributions, thus reducing the need for accurate measuring and complex sieving. However, it is thought that having a sufficient amount of small particles is important for effective fusing under the energy efficient heating conditions provided by the invention.

The blended mixture may comprise large particles or even large objects (i.e. auxiliary particles and/or objects). For example, the blended mixture may comprise at least 5 wt % particles having a particle size greater than or equal to 1 cm, suitably greater than or equal to 2 cm, suitably greater than or equal to 5 cm, suitably greater than or equal to 10 cm. Suitably the blended mixture may comprise at least 10 wt % particles having any of the aforementioned particle sizes, suitably at least 20 wt %. In some embodiments, the blended mixture comprises a pre-formed object (e.g. a mug, or a brick). In some embodiments, however, such large particles and large objects are not a part of the "blended mixture" as such (i.e. the blended mixture may still be defined as defined anywhere else herein) but are instead an auxiliary item added to or otherwise incorporated into the blended mixture (e.g. before or during heating) to allow said large particles or objects to be integrated with the ultimate composite material or shaped item. This methodology facilitates the formation of composite materials and shaped items (e.g. tiles) exhibiting a high degree of 3-dimensional character and texture.

Suitably, the blended mixture comprises less than 5 wt % synthetic binding agent, more suitably less than 3 wt %, more suitably less than 1 wt %, more suitably less than 0.1 wt %. Preferably, the blended mixture is free from synthetic binding agents.

Suitably, the blended mixture comprises less than 5 wt % binding agent (whether synthetic or natural), more suitably less than 3 wt %, more suitably less than 1 wt %, more suitably less than 0.1 wt %. Preferably, the blended mixture is free from binding agents.

In an embodiment, providing the blended mixture may include the steps of:
 providing a particulate form of each component (i.e. at least the glass component and non-glass mineral component); and
 blending the particulate forms of each component to provide a blended mixture.

Each component may be provided in a particulate form directly from the commercial source. Alternatively, a particulate form of each or any component may be provided by:
a) forming particles from (e.g. by crushing, grinding, smashing, etc.) a bulk form of the component;
b) optionally sieving the particles from step a) to collect particles below a certain particle size threshold and to reject particles above said particle size threshold;
c) optionally forming smaller particles from the particles rejected from the previous sieving step;
d) optionally further seiving the particles from step c) to collect particles below a certain (optionally different) particle size threshold and to reject particles above said particle size threshold;
e) optionally repeating steps c)-e) until the required particle sizes and/or particle size distribution is obtained.

In another embodiment, the blended mixture is formed in situ, by:
a) providing a bulk mixture of non-particulate (i.e. bulk) forms of each component;
b) forming particles from (e.g. by crushing, grinding, smashing, etc.) the bulk mixture so that together all components form a particulate mixture in situ;
c) optionally sieving the particles from step b) to collect particles below a certain particle size threshold and to reject particles above said particle size threshold;
d) optionally forming smaller particles from the particles rejected from the previous sieving step;
e) optionally further seiving the particles from step d) to collect particles below a certain (optionally different) particle size threshold and to reject particles above said particle size threshold;
f) optionally repeating steps d)-f) until the required particle sizes and/or particle size distribution is obtained;
g) optionally further mixing the particulate blended mixture to increase homogeneity.

As described above, desired particle distributions may be obtained by sequential sieving and strategic mixing of particular sieved portions as described above. However, given the tolerance of the process, sieving may be unnecessary.

In an embodiment, the blended mixture may be a substantially homogeneous mixture of all the components. With a homogeneous mixture, the optical properties (e.g. colour, refractive indices) do not change upon further mixing of the blended mixture.

In an alternative embodiment, the blended mixture is non-homogeneous, suitably for aesthetic effect. A non-homogeneous blended mixture has optical properties which change upon further blending/mixing.

Suitably, no synthetic binding agent is added to the blended mixture. Suitably, no binding agent is added to the blended mixture.

The blended mixture may be provided as a slurry (e.g. in an appropriate quantity of a slurry solvent, such as water). The slurry suitably comprises particles as described herein, suitably in any of the proportions stated where said proportions relate to the dry weight of the respective components. The slurry may be suitably viscous (or thick) to permit shaping of the composite material prior to its exposure to heat. Slurrying assists handling, mixing, and can also improve the final form of the composite material (e.g. denser and more closely packed).

Any or all of the individual components of the composite material may be provided as a slurry to assist the provision of the blended mixture. In particular, components having very small particle sizes (e.g. glaze) are suitably provided as a slurry to assist handling and mixing. However, where slurries are used in the methods of the invention, the quantities of ingredients used to form the composite material are suitably calculated on the basis of their dry weight (i.e. excluding any slurry solvent).

The present invention also provides a composite material obtainable by, obtained by, or directly obtained by any one of the methods of manufacture described herein.

Pre-Heating Steps

Suitably, prior to the blended mixture being subjected to heat, the blended mixture is shaped. Suitably, auxiliary particles and/or objects (e.g. as defined herein in relation to the large particles and/or objects, e.g. ceramic objects) may be incorporated into the surface of such a shaped blended mixture, either during shaping or after shaping, The shaped blended mixture may then be heated to permanently set the shape accordingly, to thereby provide a composite material of the required shape.

Shaping of the blended mixture may comprise pressing and/or moulding the blended mixture. Shaping may be a batch process (i.e. where a batch of blended material is shaped before a subsequent batch is shaped) or a continuous process (i.e. where the blended mixture is conveyed as a continuous feed through a shaping module—e.g. to produce continuous sheets).

A shaping step allows the blended mixture to be fashioned into the dimensions and profile required of the composite material. Where large particles and/or large objects are to be incorporated into the final composite material, said large particles and/or large objects may be incorporated during this shaping step, suitably as an additional component during the formation of a shaped item.

In an embodiment, the shaped blended mixture is conveyed to the heating step within a mould. In an alternative embodiment, the shaped blended mixture is conveyed to the heating step without a mould (i.e. the shaped blended mixture is suitably self-supporting and structurally sound enough to not require a mould—this is especially possible where at least 20 wt % non-glass mineral component(s) are used).

ii) Heating of the Blended Mixture

The blended mixture is suitably subjected to heat of a sufficient intensity and for a time sufficient to fuse the blended mixture into the composite material, suitably a single piece of composite material.

In an embodiment, subjecting the blended mixture to heat involves heating the blended mixture in a kiln, suitably in a glass or ceramic kiln. The kiln may be a gas-fired kiln or an electric kiln. The kiln may be a continuous (e.g. continuous fire kiln) or intermittent kiln.

The temperature and time of heating may be varied depending on the particular composition of the blended mixture, and potentially also on the scale of manufacture. In general, a particular composition is heated at an appropriate temperature for an appropriate amount of time to deliver composite materials of the required specification.

Suitably, the blended mixture is heated at a temperature 600-1500° C., suitably 800-1250° C., suitably at 900-1100° C., most suitably 900-1000° C. If the temperature is too low, the blended material may not sufficiently fuse. If the temperature is too high, energy may be unnecessarily wasted and furthermore bubbles may be undesirably formed in the composite materials.

Heating of the blended mixture may involve gradually increasing the temperature to a maximum heating temperature (which may be as defined above)—i.e. a temperature ramp. Suitably, the blended mixture begins at room temperature (below 40° C.). Suitably the temperature is gradually increased at a rate of between 30 and 300° C. per hour, more suitably between 50 and 200° C. per hour, most suitably between 70 and 170° C. per hour.

Suitably, the blended mixture is heated at the appropriate maximum temperature (e.g. the suitable temperatures mentioned above) for at least 5 minutes, suitably at least 10 minutes, more suitably at least 20 minutes, and most suitably at least 30 minutes. Suitably, the blended mixture is heated at the appropriate temperature for less than 1.5 hours, suitably less than 1 hour, suitably less than 45 minutes. These times are particularly applicable for producing composite materials in the form of tiles and sheets with a thickness of at most 7 cm, suitably at most 5 cm, suitably at most 2 cm.

Suitably the blended mixture/composite material is cooled following a period of heating at the maximum temperature.

In an embodiment, where the composite material is substantially lead free, the blended mixture is heated at a temperature between 950 and 1000° C. for an appropriate time.

In an embodiment, where the composite material comprises a lead component, the blended mixture is heated at a temperature between 875 and 925° C., for an appropriate time. In general, higher heating temperatures trap more lead within the composite material ultimately produced, whereas lower heating temperatures allow more lead to leach. Moreover, longer heating times allow more lead to become trapped within the composite material, whereas shorter heating times leave more lead free to leach out of the composite material. As such, an optimal heating temperatures and heating times for a given blended mixture allow for an optimal lead leaching profile to maximise antimicrobial activity at the surface of the composite material whilst minimising toxicity to humans.

The heating temperatures described herein and above suitably relate to the highest temperatures to which the composite materials are exposed during heating. A person skilled in the art may refer to this as the "soak" temperature. Moreover, the heating times described herein and above suitably relate to the time over which the composite materials are subjected to the relevant heating temperatures—this is sometimes referred to as the "soak" time. In a particular embodiment, the composite material is subjected to a 30-50 minutes soak, most preferably about a 40 minute soak, at the appropriate soak temperature.

It will be understood by those skilled in the art that the blended mixture is typically subjected to a temperature gradient, suitably increasing from a starting temperature (e.g. room temperature, ~20° C.) to a top temperature (i.e. soak temperature, e.g. 850-1350° C.), prior to heating/"soaking" (i.e. heating at the soak temperature for the soak time). A suitable temperature gradient is between 30 and 90° C. per hour, more suitably 50 to 70° C. per hour.

In an embodiment, the shaped blended mixture is heated in the absence of a mould, especially where at least 20 wt % non-glass mineral component(s) is used in the blended mixture. Large particles and/or large objects incorporated into the blended mixture prior to heating bond particularly well within the composite material where at least 20 wt % non-glass mineral component is used in the blended mixture.

Suitably, after heating/soaking, the composite material is allowed to cool naturally (e.g. at room temperature or in an unheated kiln) without being force cooled. However, forced cooling also provides an acceptable product, albeit test results do not at present demonstrate any benefit of forced cooling.

Post-Heating Steps and Finishing

In an embodiment, once the composite material is produced following appropriate heating, the composite material is subjected to rapid cooling, and optionally excess heat is "recovered" to reduce energy wastage. In another embodiment, following appropriate heating, the composite material is naturally cooled.

Suitably, following heating, the composite material is not annealed, for instance, there is no stepwise cooling process. Such an absence of annealing is especially applicable where the composite material or blended mixture comprises at least 20 wt % non-glass mineral component. An advantage of being able to dispense with an annealing step includes significant energy saving and reduction in manufacturing times. In particular this reduced annealing requirement facilitates heat recovery, rapid water cooling, and enables more rapid transit through the tunnels of continuously-fired kilns.

Once formed, the composite material may be subjected to one or more of the following finishing steps:
a) Grinding (e.g. to give a smooth surface);
b) Cutting (e.g. with a diamond saw);
c) Stone-finishing;
d) Polishing.

Any by-products from the composite material manufacturing process, such as trimmings, off cuts, or slurries, may be reintroduced into the manufacturing cycle and processed as above described.

Finally, any unwanted waste composite material products, including used products, may themselves be reintroduced into the manufacturing process and duly recycled. This is particularly plausible where the composite material is free of synthetic binders or binders in general.

Uses of the Composite Material

According to an aspect of the present invention there is provided a shaped item comprising the composite material described herein. In an embodiment, the shaped item is made from the composite material described herein. However, in some embodiments, the shaped item comprises the composite material and auxiliary particle(s) or object(s), such as the large particle(s) and/or object(s) defined herein.

The shaped item is suitably a recyclable product. The shaped item suitably provides a decorative surface. The shaped item may be decorated with a variety of colours and textures. Colour and textures of the shaped item may be influenced by the composition of components in the blended mixture. Alternatively or in addition, the shaped item may itself be treated with a glaze (e.g. by fusing a glaze to the composite material as per the glazing of ceramics).

Suitably, the shaped item is selected from the group including a composite sheet, interior and exterior tiles, exterior sheet cladding, decorative facing brick, surface tops (e.g. kitchen work-surfaces), building units (e.g. bricks).

In an embodiment, the shaped item is a composite sheet material or tile. Such sheets or tiles suitably have a thickness of at least 0.5 cm, suitably at least 1 cm, suitably at least 1.2 cm. The sheets or tiles suitably have a thickness of at most 10 cm, suitably at most 7 cm, suitably at most 5 cm, suitably at most 3 cm, suitably at most 2 cm. When too thin, the composite material can be brittle. If too thick, the composite material may not sufficiently anneal or fuse under heating. Thicker sheets and tiles may be used to produce surface tops and the like, such as kitchen worktops, table tops, desktops, hospital worktops, etc. Thicker tiles may be used to produce exterior cladding materials for building exteriors. Thinner tiles may be used to produce interior tiles.

Shaped items, such as composite sheet materials and tiles, may incorporate large particles and/or objects (e.g. a mug or brick) as described herein to provide a unique 3-dimensional surface texture. Such unique designs are made especially possible through using at least 20 wt % non-glass mineral component within the composite material and/or blended mixtures in question. Suitably, quantitative values given herein in relation to the composite material and/or blended mixture may exclude any large particles and/or large objects described herein, since such large particles and/or large objects may be considered auxiliary items which are additionally incorporated into said composite materials and/or blended mixtures. The composite materials and/or blended mixtures of the invention are especially good at bonding directly to large particles and/or large objects, such as ceramic items, by virtue of their unique composition which enables such multi-functionality.

In an embodiment, the shaped item is an ornamental piece, such as a figurine.

The shaped item may itself be bonded (e.g. via adhesive or cement) or fused to another body (e.g. a wall or worktop).

In an embodiment, the shaped item additionally comprises a decorative piece embedded (or partially embedded) within the composite material, suitably such that the decorative piece is visible at the surface. Suitably the decorative piece is fused with the decorative piece, suitably during the step of heating the blended mixture to form the composite material. As such, the decorative piece is suitably embedded (or partially embedded) within the blended mixture prior to heating. Suitably the decorative piece is made from recyclable materials, such as glass or ceramics. By way of example, the shaped item may be a kitchen wall tile having the spout or handle of a teapot embedded therein to decorate the tile. The spout or handle of the teapot may be fully embedded, so that the tile has a smooth surface finish, or only partially embedded so as to provide an embossed effect.

The shaped item may provide an antimicrobial surface, for instance, where the composite material comprises a lead component. In a particular embodiment, the shaped item is a worktop (e.g. kitchen or hospital worktop) with an anti-microbial surface.

The present invention also provides a use of the composite material as described herein to provide a decorative surface.

EXAMPLES

The present invention is now further described in detail in relation to the following non-limiting examples of sheets made from the composite material of the present invention.

Example 1

In a particular example, sheets were made to the following dimensions from a composite material:
30×30×2.5 cm cladding tiles
50×50×1.25 cm wall tiles
75×50×4.5 cm worktop The composite material of each of the three abovementioned sheets consisted of:
~50 wt % particulate household glass waste (i.e. crushed used bottles/jars);
~40 wt % particulate industrial ceramic waste (crushed waste sanitary ware obtained from Armitage Shanks™)
~10 wt % particular ceramic glaze (crushed glaze from vitrified sanitary ware obtained from earthenware or the tile industry)
~1 wt % pigment metal oxide
(amounts suitably adjusted so that all totals 100 wt %)

This equates to 100% waste materials (excluding the pigment).

The composite material was made according to the process described schematically in FIG. 1. Firstly, vitrified ceramic and glass was separately crushed in a laboratory crusher (Retch BB200). Two passes through the crusher produced particulate glass and ceramic waste which together had a particle distribution (as determined by sieve analysis) of:

45 wt % dust-355 µm
20 wt % 355 µm-500 µm
10 wt % 500 µm-1000 µm
11 wt % 1000 µm-1400 µm
9 wt % 1400 µm-2000 µm The particulate glass and particulate ceramics are then dry mixed to achieve a uniform distribution of the two materials. Glaze waste and pigment (both of which are 100% dust—i.e. having a particle size of 355 µm or less) is then dry weighed before being mixed (with an industrial blender) with water to form 13% (by volume) smooth glaze slurry in water.

The glaze slurry is then mixed with the dry particulate mixture of glass and ceramic waste to form a substantially homogenous mix—the consistency of the final blended mixture is similar to that of wet mortar. If preferred, more water may be added to adjust the consistency of the blended mixture, for example, when producing thinner tiles.

The blended mixture was then pressed and moulded into a desired shape. A standard kiln bat or shelf formed the base of the mould. A mould made from MDF was used to define the shape and depth of the product. These were clamped to the kiln bat and the material was pressed into the mould. If desired, a texture may be added to the surface by hand or via a trowel to achieve a flat uniform surface. After 5 mins the kiln bat had absorbed the moisture from the tile and the temporary MDF moulds was removed.

Figure 2:
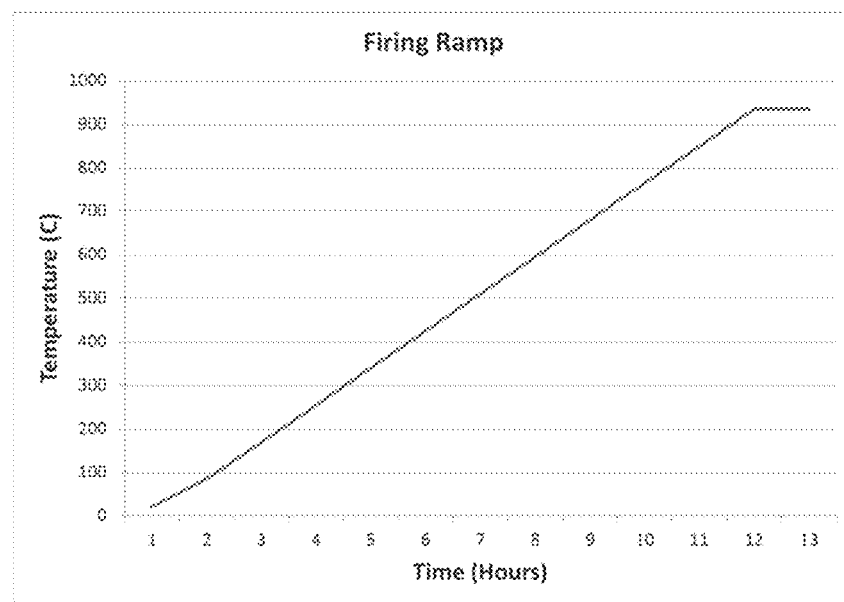
FIG. 2 is a line graph illustrating the kiln firing ramp employed in the embodiment of FIG. 1.

The kiln bat was then transferred to the kiln and fired according to the schedule shown in FIG. 2 (i.e. with a temperature ramp of 85° C. per hour to top temperature of 935° C. with a 40 minute soak/hold at top temperature).

Rapid cooling of the sheets then ensued before the sheets were removed and then finished/dimensioned as required. The sheets were finally polished before being packed for the use described above.

Test Results

The three sheets were all tested in terms of their porosity (water absorption), freeze-thawing, dimensions and surface quality, modulus of rupture and breaking strength, impact resistance through measurement of the coefficient of restitution, linear thermal expansion, lead and cadmium leaching. Testing was performed in accordance with BS EN ISO 10545:1997. In all cases, the composite materials were deemed to surpass expectations.

In particular, all of the above three sheets were subjected to porosity and freeze-thaw testing and all exceeded the required British Standards for exterior construction materials, specifically BS 3921:1985, BS EN 772-7:1998; prEN 771-1:2000:Annex C (all for water absorption); and CEN/TS 772-22:2005 (Freeze testing).

Furthermore, particle integration testing (i.e. to examine effective fusing of the components of the composite material) was conducted using electron microscopy/EDAX analysis, and in all cases particle integration was deemed successful. The instruments used for this analysis were a FEI Quantum 2000 with FEI Quantum EDAX for analysis. The analyses were performed under standard high vacuum conditions with 10-12 kV. In cases where overcharging of the surface produced "white out" the surface was sprayed with water vapour in low vacuum mode to discharge the charge build up.

Example 2

Further tests were carried out upon sheets of composite material made in accordance with the invention, both with and without a lead content (i.e. in this example, lead oxide).

Sheets of composite material were made consisting of the same ingredients set out in Example 1, except that the glass component was varied between cathode ray tube glass (CRT glass with 25% w/w lead oxide) and the glass of Example 1 (i.e. particulate household glass waste):

50 wt % glass component (varied for the tests);
40 wt % particulate industrial ceramic waste (crushed waste sanitary ware/obtained from Armitage Shanks™)
10 wt % particular ceramic glaze (crushed glaze from sanitary ware, earthenware, or tiles)
1 wt % pigment metal oxide In the present example, sheets, which were fashioned as 50×50×1.25 cm wall tiles, were produced in accordance with the process of Example 1, with the same particle sizes and blending protocols. Heating protocols were the same, except that the maximum temperatures of the kiln were either 900° C. or 1085° C. (see Table 1 below).

Table 1 below shows test results of composite materials which vary only in respect of their particular glass component and the particular firing temperatures used in the kiln.

TABLE 1

Illustrates various properties of composite materials formed within or without CRT glass at different kiln firing temperatures.

| Example No. | Glass component | Kiln firing temperature (° C.) | Lead Release mg/l | Lead Release mg/dm$^3$ | Impact Resistance/ Coefficient of Restitution | Modulus of Rupture (N/mm$^2$) | Breaking Strength/N |
|---|---|---|---|---|---|---|---|
| 2.1A | CRT | 1085° C. | 3.3 | 0.2 | | | |
| 2.1B | CRT | 1085° C. | 3.2 | 0.2 | | | |
| 2.1C | CRT | 1085° C. | 3.3 | 0.2 | | | |
| 2.2A | CRT | 900° C. | 22 | 1.5 | 0.64 | 11.5 | 1751 |
| 2.2B | CRT | 900° C. | 17.6 | 1.2 | | | |
| 2.2C | CRT | 900° C. | 11.6 | 0.8 | | | |
| 2.3A | Non-CRT (Glass of Example 1) | 900° C. | | | 0.66 | 12.1 | 1930 |

Tests were conducted upon 3 CRT glass-containing samples kiln heated at 1085° C. (Example 2.1A-2.1C), 3 CRT glass-containing samples kiln heated at 900° C. (Example 2.2A-2.2C), and 1 standard household waste glass-containing sample kiln heated at 900° C. (Example 2.3A).

Firstly, lead leaching was measured (mg/l) and Examples 2.1 leached significantly less lead than Examples 2.2. This is thought to be due to the higher kiln heating temperatures used for Examples 2.1, which is likely to entrap the lead oxide more effectively and thereby inhibit its release from the kiln-baked bulk. Though lead leaching is acceptable from a human toxicity point of view in both sets of Examples 2.1 and 2.2, a degree of lead leaching is desirable in order to provide an antibacterial surface. As such, kiln temperatures and/or the proportions of CRT glass present in the glass component may be adapted to provide optimal levels of lead leaching depending on the particular application of the composite materials produced. For example, composite materials of the invention may be utilised as hospital work surfaces, in which case a relatively high level of lead leaching or at least surface-lead content may be desirable to provide a antibacterial effect.

Secondly, the impact resistance, modulus of rupture, and breaking strength were also measured in respect of Examples 2.2 and Example 2.3 to demonstrate that the strength and impact resistance of the CRT-derived composites are comparable to the non-CRT-derived composites. Again, testing was carried out in accordance with BS EN ISO 10545:1997. In each case, impact resistance and strength are excellent, thus confirming the suitability of composites of the invention in relation to a wide range of applications.

Example 3

In a particular example, sheets were made to the following general dimensions from a composite material:
30×30×2.5 cm cladding tiles
50×50×1.25 cm wall tiles
75×50×4.5 cm worktop The composite material of each of the three abovementioned sheets consisted of:
~50 wt % particulate household glass waste (i.e. crushed used bottles/jars);
~40 wt % particulate industrial ceramic waste (crushed waste sanitary ware obtained from Armitage Shanks™)
~10 wt % particular ceramic glaze (crushed glaze from vitrified sanitary ware obtained from earthenware or the tile industry)
~1 wt % pigment metal oxide
(amounts suitably adjusted so that all totals 100 wt %)

This equates to 100% waste materials (excluding the pigment).

The composite material was made according to the process described in Example 1 (and FIG. 1), except that when the blended mixture is pressed and moulded into a desired shape, additional large particles (e.g. stones of at least 1 cm in size) are also pressed into the surface as well as parts of a large ceramic item (e.g. the handle of a teapot) in order to provide the surface with more 3-dimensional texture. A standard kiln bat or shelf formed the base of the mould. A mould made from MDF was used to define the shape and depth of the product. These were clamped to the kiln bat and the material was pressed into the mould. If desired, a texture may be added to the surface by hand or via a trowel to achieve a flat uniform surface. After 5 mins the kiln bat had absorbed the moisture from the tile and the temporary MDF moulds was removed.

The kiln bat was then transferred to the kiln and fired according to the schedule shown in FIG. 2 (i.e. with a temperature ramp of 85° C. per hour to top temperature of 935° C. with a 40 minute soak/hold at top temperature).

Rapid cooling of the sheets then ensued before the sheets were removed and then finished/dimensioned as required. The sheets were finally polished before being packed for the use described above.

The tile product exhibited significant 3D surface texture with up to 5 cm difference in heights across the surface. Such effects can replicate natural stone formations or tessellating patterns for wall surfaces.

The invention claimed is:

1. A composite material comprising a fused mixture of:
a glass component; and
a non-glass mineral component;
wherein the composite material comprises less than 5 wt % synthetic binding agents, and at least 20 wt % non-glass mineral component;
wherein the non-glass mineral component comprises at least 60 wt % ceramics;
wherein:
the glass component comprises glass particles and the non-glass mineral component comprises non-glass mineral particles that include ceramics particles; and
the ceramics are vitrified ceramics;
wherein the components of the composite material are bound together within a fused-glass matrix.

2. The composite material as claimed in claim 1, wherein at least 65 wt % of the non-glass mineral particles, before fusion, have a particle size of less than 2 mm.

3. The composite material as claimed in claim 1, wherein the composite material comprises between 30 and 80 wt % glass component.

4. The composite material as claimed in claim 1, wherein the composite material comprises:
30 to 80 wt % glass particles;
20 to 70 wt % non-glass mineral particles, where the non-glass mineral component comprises at least 60 wt % vitrified ceramic particles;
wherein the composite material comprises less than 1 wt % synthetic binders.

5. The composite material as claimed in claim 4, wherein the composite material comprises a heat-fused blended particulate mixture of the glass and non-glass particles.

6. The composite material as claimed in claim 1, wherein the composite material comprises an inorganic antimicrobial agent.

7. The composite material as claimed in claim 1, wherein the at least 60 wt % vitrified ceramics consists essentially of waste and/or recycled vitrified ceramics.

8. The composite material as claimed in claim 7, wherein the waste and/or recycled vitrified ceramics are derived from vitrified sanitary ware.

9. The composite material as claimed in claim 1, wherein the glass component comprises an inorganic antimicrobial agent.

10. The composite material as claimed in claim 9, wherein the antimicrobial agent is a lead component.

11. The composite material as claimed in claim 6, wherein the inorganic antimicrobial agent is a lead component.

12. The composite material as claimed in claim 1, wherein the composite material has a density of 2-3 g/cm$^3$.

13. The composite material as claimed in claim 1, wherein the composite material is porous.

* * * * *